United States Patent
Marushak et al.

(10) Patent No.: US 7,206,875 B2
(45) Date of Patent: Apr. 17, 2007

(54) EXPANDER DEVICE CAPABLE OF PERSISTENT RESERVATIONS AND PERSISTENT AFFILIATIONS

(75) Inventors: Nathan E. Marushak, Gilbert, AZ (US); Chet R. Douglas, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 10/815,270

(22) Filed: Mar. 31, 2004

(65) Prior Publication Data

US 2005/0228924 A1    Oct. 13, 2005

(51) Int. Cl.
*G06F 13/12* (2006.01)
(52) U.S. Cl. .................................. 710/62; 710/315
(58) Field of Classification Search ............... 710/300, 710/315, 8, 62
See application file for complete search history.

(56) References Cited

U.S. PATENT DOCUMENTS

| | | | |
|---|---|---|---|
| 5,499,378 A | * | 3/1996 | McNeill et al. ............... 703/24 |
| 5,748,924 A | * | 5/1998 | Llorens et al. ................ 710/62 |
| 5,802,327 A | * | 9/1998 | Hawley et al. ............. 710/300 |

(Continued)

FOREIGN PATENT DOCUMENTS

| GB | EP 1246060 | * 10/2001 |
|---|---|---|
| US | EP 1321848 | * 12/2002 |

OTHER PUBLICATIONS

Ralph Weber, "Information technology-SCSI Primary Commands-3(SPC-3)", p. 62.*
"American National Standard for Information Technology—Fibre Channel-Physical and Signalling Interface-3 (FC-PH-3)", *Developed by incits, Where IT all Begins, Table of Contents*, (1998), 6 pgs.
"PCI Express Based Specification Revision 1.0", *PCI Express, Table of Contents*, (Jul. 22, 2002), 15 pgs.
"PCI-X Addendum to the PCI Local Bus Specification", *Revision 1.0a, Table of Contents*, (Jul. 24, 2000), 9 pgs.
"Serial ATA: High Speed Serialized AT Attachment, Serial ATA Workgroup", *Revision 1.0a, Table of Contents*, APT Technologies, Inc., (Jan. 7, 2003), 10 pgs.
"Working Draft American National Standard, Project T10/1601-D", *Revision 1, Table of Contents*, Information Technology—Serial Attached SCSI-1.1 (SAS-1.1),(Sep. 18, 2003),24 pgs.
"Working Draft, Project T10/1416-D", *Information Technology-SCSI Primary Commmands-3 (SPC-3), Table of Contents*, (May 16, 2003), 19 pgs.

*Primary Examiner*—Khanh Dang
(74) *Attorney, Agent, or Firm*—Grossman, Tucker, Perreault & Pfleger, PLLC

(57) ABSTRACT

A method according to one embodiment may include creating at least one of a persistent reservation and a persistent affiliation between one or more target SATA storage devices and one or more initiator engines. Of course, many alternatives, variations, and modifications are possible without departing from this embodiment.

27 Claims, 5 Drawing Sheets

U.S. PATENT DOCUMENTS

| | | | | |
|---|---|---|---|---|
| 5,892,964 A * | 4/1999 | Horan et al. | ............... | 712/33 |
| 6,286,056 B1 * | 9/2001 | Edgar et al. | ............... | 710/5 |
| 6,480,925 B1 * | 11/2002 | Bodo | ............... | 710/307 |
| 6,601,119 B1 * | 7/2003 | Slutz et al. | ............... | 710/104 |
| 6,654,902 B1 * | 11/2003 | Brunelle et al. | ............... | 714/4 |
| 6,804,703 B1 * | 10/2004 | Allen et al. | ............... | 709/216 |
| 6,996,642 B2 * | 2/2006 | Apperley et al. | ............... | 710/74 |
| 2003/0065782 A1 * | 4/2003 | Nishanov et al. | ............... | 709/226 |
| 2003/0188233 A1 * | 10/2003 | Lubbers et al. | ............... | 714/100 |
| 2004/0117522 A1 * | 6/2004 | Loffink et al. | ............... | 710/74 |
| 2004/0148460 A1 * | 7/2004 | Steinmetz et al. | ............... | 711/114 |
| 2004/0148461 A1 * | 7/2004 | Steinmetz et al. | ............... | 711/114 |
| 2004/0205288 A1 * | 10/2004 | Ghaffari et al. | ............... | 711/100 |
| 2004/0236908 A1 * | 11/2004 | Suzuki et al. | ............... | 711/114 |
| 2004/0267516 A1 * | 12/2004 | Jibbe et al. | ............... | 703/24 |
| 2005/0193159 A1 * | 9/2005 | Ng et al. | ............... | 710/302 |
| 2005/0193235 A1 * | 9/2005 | Sandorfi et al. | ............... | 714/6 |
| 2005/0216604 A1 * | 9/2005 | Loffink et al. | ............... | 710/3 |
| 2005/0278465 A1 * | 12/2005 | Qi | ............... | 710/36 |
| 2006/0025018 A1 * | 2/2006 | Dube et al. | ............... | 439/628 |

* cited by examiner

EXPANDER DEVICE CAPABLE OF PERSISTENT RESERVATIONS AND PERSISTENT AFFILIATIONS

FIELD

The present disclosure relates to an expander device capable of persistent reservations and persistent affiliations.

BACKGROUND

In one conventional data storage arrangement, a computer node includes a host bus adapter (HBA). The HBA communicates with a data storage system via one or more communication links using a communication protocol associated with the one or more links. Target drives in the data storage system may include drives that communicate using different communication protocols. Certain communication protocols provide persistent reservations, which may permit exclusive access rights between an HBA and one or more drives in the data storage system. However, these communication protocols do not provide such persistent reservations for a plurality of drive types, and will only provide persistent reservations or persistent affiliations for drives adhering to selected communication protocols. Thus, conventional data storage systems are incapable of providing persistent reservations for drives in a data storage system that may not adhere to a selected communication protocol. Thus, conventional data storage systems may limit the number of drives capable of persistent reservations and/or persistent affiliations.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
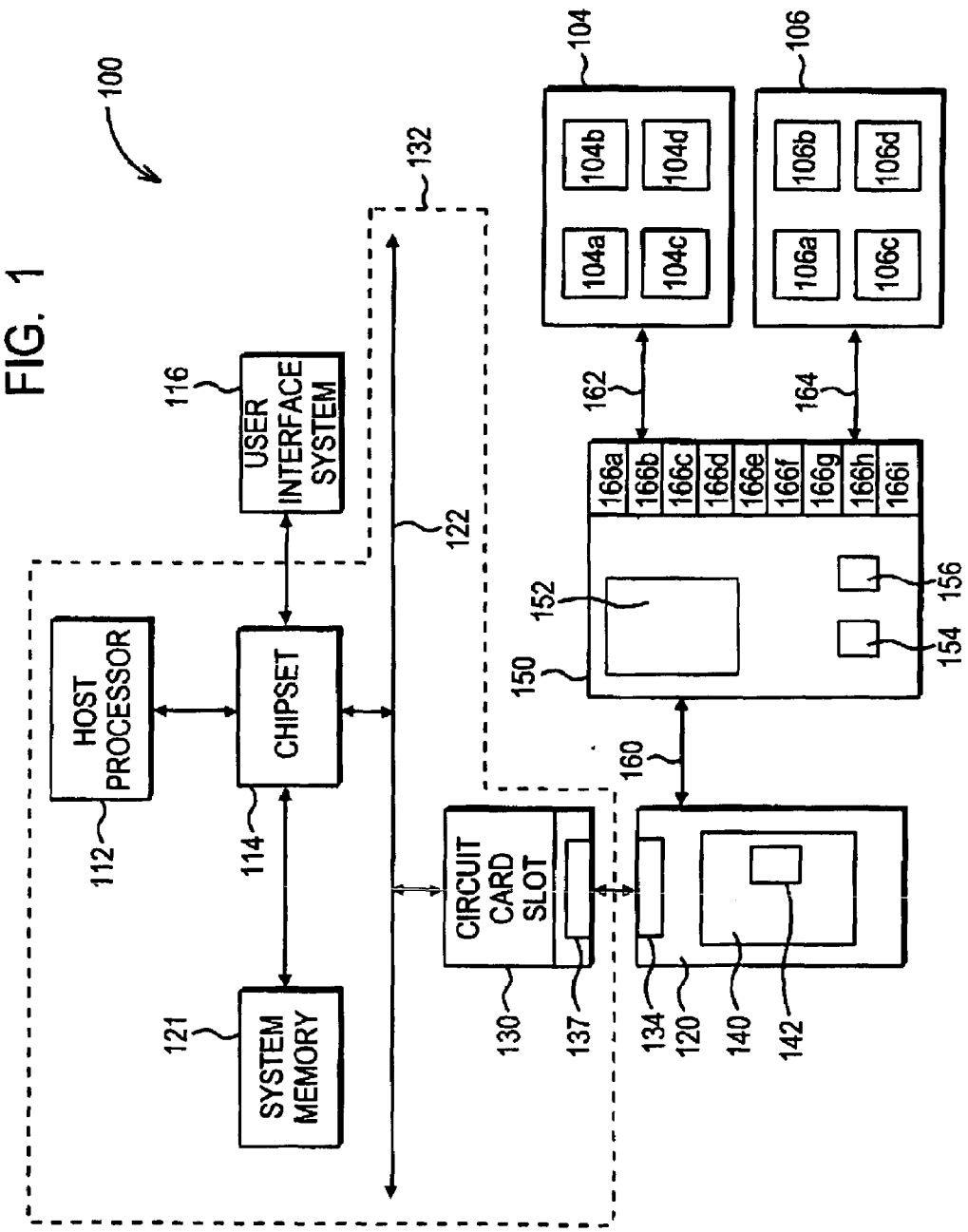
FIG. 1 is a diagram illustrating a system embodiment.

FIG. 1 illustrates a system embodiment 100 of the claimed subject matter. The system 100 may generally include a host processor 112, a bus 122, a user interface system 116, a chipset 114, system memory 121, a circuit card slot 130, and a circuit card 120 that is capable of communicating with the mass storage 104. The host processor 112 may include any variety of processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may also comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface 116 may include a variety of devices for human users to input commands and/or data and to monitor the system such as a keyboard, pointing device, and video display. The chipset 114 may include host bridge/hub system (not shown) that couples the processor 112, system memory 121, and user interface system 116 to each other and to the bus 122. Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 112, system memory 121, chipset 114 and circuit card slot 130 may be integrated onto one motherboard 132.

The circuit card 120 may be constructed to permit it to be inserted into slot 130. When the circuit card 120 is properly inserted into slot 130, connectors 134 and 137 become electrically and mechanically coupled to each other. When connectors 134 and 137 are so coupled to each other, the card 120 becomes electrically coupled to bus 122 and may exchange data and/or commands with system memory 121, host processor 112, and/or user interface system 116 via bus 122 and chipset 114. Alternatively, without departing from this embodiment, the operative circuitry of the circuit card 120 may be included in other structures, systems, and/or devices. These other structures, systems, and/or devices may be, for example, in the motherboard 132, coupled to the bus 122. Processor 112, system memory 121, chipset 114, bus 122, and circuit card slot 130 may be comprised in a single circuit board. Alternatively, and without departing from this embodiment, circuit card 120 may comprise one or more chipsets comprised in the system motherboard 132.

The circuit card 120 may communicate with the mass storage 104 and/or 106 using a plurality of communication protocols. Circuit card 120 may comprise a host bus adaptor (HBA) which may be capable of exchanging commands and data between processor 112 and mass storage 104 and/or 106. The circuit card 120 may comprise one or more of a protocol initiator engine 140 that is adapted to initiate communication between the host system 132 and the mass storage 104 and/or 106. The initiator engine 140 may comprise an integrated circuit that may include circuitry that is capable of initiating communication between the host system 132 and the mass storage 104 and/or 106. As used in any embodiment herein, "circuitry" may comprise, for example, singly or in any combination, hardwired circuitry, programmable circuitry, state machine circuitry, and/or firmware that stores instructions executed by programmable circuitry.

If a Fibre Channel (FC) protocol is used by circuit card 120 to exchange data and/or commands with mass storage 104 and/or 106, it may comply or be compatible with the interface/protocol described in "ANSI Standard Fibre Channel Physical and Signaling Interface-3 X3.303:1998 Specification." Alternatively or additionally, if a serial ATA (S-ATA) protocol is used by controller circuit card 120 to exchange data and/or commands with mass storage 104 and/or 106, it may comply or be compatible with the protocol described in "Serial ATA: High Speed Serialized AT Attachment," Revision 1.0a, published on Jan. 7, 2003 by the Serial ATA Working Group and/or earlier and/or later published versions of the SATA standard. Further alternatively or additionally, if a serial attached small computer system interface (SAS) protocol is used by controller circuit card 120 to exchange data and/or commands with mass storage 104 and/or 106, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard. The SAS protocol may comprise Serial Advanced Attachment (ATA) Tunneled Protocol (STP) and Serial Small Computer System Interface (SCSI) Protocol (SSP).

Initiator engine 140 may comprise SAS initiator circuitry 142 capable of communicating with one or more drives comprised in mass storage 104 and/or mass storage 106 using SAS communication protocols. SAS initiator circuitry 142 may be capable of generating serial management protocol (SMP) commands, which may be defined by the aforementioned SAS standard, for exchanging commands and data with one or more drives comprised in mass storage 104 and/or 106.

In this embodiment, mass storage 104 may comprise one or more Serial SCSI disks 104a, 104b, 104c and/or 104d that comply or are compatible with SSP communication protocols (hereinafter "SAS drives"). Mass storage 106 may comprise one or more Serial ATA disks 106a, 106b, 106c, 106d, each of which may comply or is compatible with STP communication protocols (hereinafter "SATA drives"). In this embodiment, mass storage 104 and mass storage 106 may each comprise, individually or collectively, a clustered network storage environment. The network storage environment may comprise a SAS network. Both SAS and SATA drives may be connected to a SAS network, and SATA drives may be connected to a SAS network and may communicate using the aforementioned STP protocols and/or SATA communication protocols.

The present embodiment may also comprise an expander device 150 coupled to circuit card 120 via communications link 160. The expander device may also be coupled to mass storage 104 and/or 106, via communications links 162 and 164, respectively. As used in any embodiment herein, an "expander device" may comprise one or more integrated circuits which may comprise circuitry to transmit and/or receive at least one signal. Expander device 150 may be capable of coupling a plurality of drives together, such as drives comprised in mass storage 104 and/or 106, in a clustered environment. The expander device 150 may also be capable of expanding the number of target drives which may be coupled to circuit card 120, which may form a clustered network storage environment.

The expander device 150 may comprise SAS expander circuitry 152, memory 154 and memory 156. Memories 154 and/or 156 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory may comprise other and/or later-developed types of computer-readable memory. Machine-readable firmware program instructions may be stored in memory. As described below, these instructions may be accessed and executed by expander circuitry 152. When executed by SAS expander circuitry 152, these instructions may result in expander circuitry 152 performing the operations described herein as being performed by expander circuitry 152 and/or expander 150. Additionally, memory 156 and/or other memory (not shown) may be capable of storing persistent reservations and/or persistent affiliations, as may be defined herein.

Expander device 150 may also comprise one or more physical interfaces (PHY) 166a, 166b, 166c, 166d, 166e, 166f, and/or 166g capable of electrically coupling expander device 150 with one or more SAS and/or SATA drives comprise in mass storage 104 and/or 106. A "PHY" may be defined as an object and/or circuitry used to interface to one or more devices, and such object and/or circuitry may be defined by one or more of the communication protocols set forth herein. The PHY may comprise a physical PHY containing transceiver circuitry to interface to the applicable communication link. The PHY may alternately and/or additionally comprise a virtual PHY to interface to another virtual PHY or to a physical PHY. Each PHY may have a unique identifier. The expander device 150 may also comprise one or more ports (not shown). A port may contain one or more PHYs. For example, a narrow port may contain only one PHY, while a wide port may contain more than one PHY. In the embodiment of FIG. 1, a cluster of SAS drives (104) may be coupled to a plurality of PHYs comprised in expander 150, for example PHYs 166a, 166b, 166c, and 166d. Also in the embodiment of FIG. 1, a cluster of SATA drives (106) may be coupled to a plurality of PHYs comprised in expander 150, for example 166f, 166g, 166h and 166i. Thus, although FIG. 1 depicts communication link 162 which may couple mass storage 104 to expander 150 and communication link 164 which may couple mass storage 106 to expander 160, it should be understood that a plurality of communication links may be provided in this embodiment, for example, one link provided between each PHY and each drive comprised in mass storage 104 and 106. Circuitry 152 may be capable of controlling one or more PHYs comprised in expander 150, for example, in a manner described below.

Referring specifically to SAS drives comprised in mass storage 104, SAS initiator circuitry 142 may be capable of generating SCSI commands to provide, for example, persistent reservations between one or more SAS drives comprised in the mass storage cluster 104 and one or more initiator engines 140. Such SCSI commands may be transmitted by SAS initiator 142 and transmitted through expander device 150 to one or more SAS drives, using for example, SSP commands. SCSI commands, as used herein, may comprise one or more commands as described in "Information Technology—SCSI Primary Commands—3 (SPC-3)" published on May 16, 2003 by the T10 Technical Committee of Accredited Standards Committee and/or later published versions. "Persistent reservations", as used in any embodiment herein, may comprise one or more SCSI Primary Commands capable of reserving one or more SAS drives for one or more initiator engines 140. Also, "persistent reservations", as used in any embodiment herein, may mean that reservations, as may be defined by the aforementioned T10 standard, may be maintained across power cycles (i.e., reset and/or reboot events occurring at the circuit card 120, expander device 150 and/or one or more SAS drives). A "reservation" may mean initiator engine 140 may be granted exclusive access to an entire SAS drive, or certain portions of a SAS drive. Alternatively, reservations may mean that an initiator engine 140 is granted limited exclusive access, read-only access, write only access, and/or other reservations as may be defined in the aforementioned T10 standard. Of course, SAS circuitry may be capable of other operations as may be defined in the SCSI Primary Commands without departing from this embodiment.

Conventional SATA drives do not support persistent reservations. Accordingly, in this embodiment, the expander device 150 may be capable of emulating SCSI commands to provide persistent reservations for one or more SATA drives coupled thereto. Persistent reservation emulation commands may be stored in memory 154. Persistent reservation emulation commands stored in memory 154 may be accessed by expander circuitry 152 to cause expander circuitry 152 to provide persistent reservations for one or more SATA devices comprised in mass storage 106, as will be described below.

Referring again to SAS drives comprised in mass storage 104, SAS initiator circuitry 142 may be capable of exchanging commands and data with expander device 150 and/or one or more SATA drives to create persistent affiliations between one or more SAS drives comprised in the mass storage cluster 106 and one or more initiator engines 140. Persistent affiliations between initiator engine 140 and one or more SATA drives may be created using the aforementioned SAS communication protocols. Also, "persistent affiliations", as used in any embodiment herein, may mean affiliations, as may be defined by the aforementioned SAS standard, which may be maintained across power cycles (i.e., reset and/or reboot events occurring at the circuit card 120, expander device 150 and/or one or more SAS drives). An "affiliation" may mean initiator engine 140 may be granted exclusive access to an entire SATA drive as may be defined in the aforementioned SAS standard. Of course, SAS circuitry 142 may be capable of other operations as may be defined in the SCSI Primary Commands without departing from this embodiment.

SAS initiator circuitry 142 and SAS expander circuitry 152 may be capable of exchanging one or more SMP requests and/or commands and transmitting such requests and/or commands to expander device 150. SMP request and/or commands may comprise, for example, standard SMP requests and/or commands as may be defined by the aforementioned SAS standard. Standard SMP requests may comprise standard fields and/or vendor-specific fields. Vendor specific fields may comprise fields which may be defined by third parties, i.e., one or more fields within a SMP request that may be defined by third parties. Additionally or alternatively, SMP requests and/or commands generated by initiator circuitry 142 and SAS expander circuitry 152 may comprise vendor-specific requests and/or commands, which may be defined by third parties, i.e., one or more SMP requests and/or commands which may comply or be compatible with SMP protocols as may be defined in the aforementioned SAS standard but are not specifically provided in the SAS standard. SMP commands and requests may contain information indicative of persistent reservations and/or persistent affiliations.

When initiator circuitry 142 establishes a connection with expander device 150 via communications link 160, initiator circuitry 142 may be capable of determining if the expander device 150 is capable of providing persistent reservations and/or persistent reservations for one or more SATA drives. Also, initiator circuitry 142 may be capable of exchanging commands and data with expander device 150 to define persistent reservations and/or persistent affiliations which may be carried out by expander device 150. Persistent reservations and/or persistent affiliations, which may be defined for one or more SATA drives connected to expander device 150, may be stored in memory 156 to permit expander device 150 to maintain reservations across power cycles. Memory 154 may comprise instruction that when accessed by circuitry 152 cause circuitry 152 to generate SMP commands and/or requests, as described more fully below. Operational aspects of the present embodiment are described in more detail below with reference to FIGS. 2 and 3.

Figure 2:
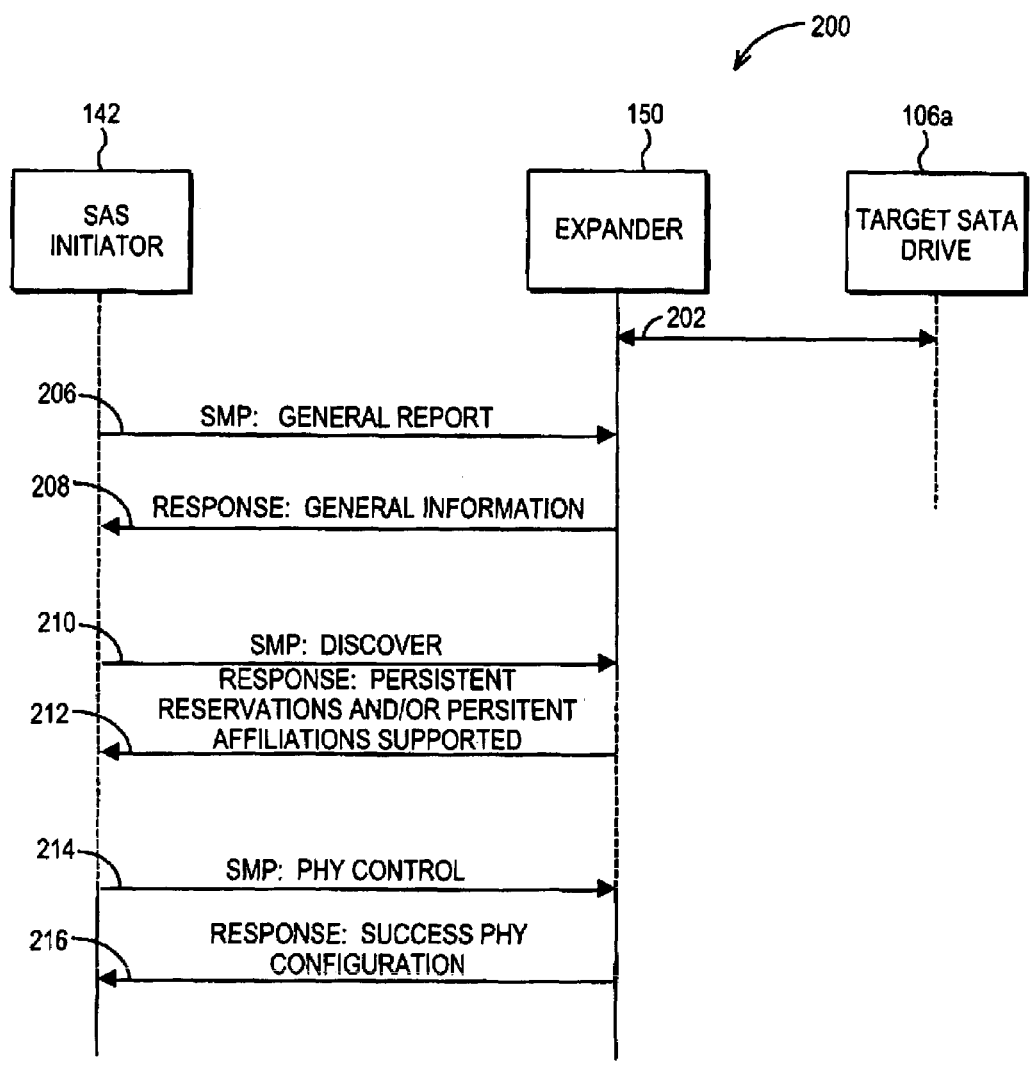
FIG. 2 is a diagram illustrating exemplary operations according to one embodiment.

Exemplary Persistent Reservation and/or Persistent Affiliation Configuration Sequence FIG. 2 depicts a diagram 200 illustrating operations which may be performed by an embodiment. In FIG. 2, certain portions of the system 100 depicted in FIG. 1 have been omitted for clarity (for example circuit board 132 and circuit card 120), but it is to be understood that like parts of FIG. 2 can be implemented in a manner consistent with an embodiment depicted in FIG. 1, or alternatively in other system implementations, without departing from this embodiment. The following description of the diagram 200 of FIG. 2 shall make specific reference operations for providing persistent reservations for SATA drive 106a comprised in mass storage 106. However, it should be understood that the following description can apply to any SATA drive, whether or not comprised in mass storage 106.

Expander device 150 and target SATA drive may be capable of generating signal sequence 202 which may cause expander device 150 to determine that a SATA device is present and the speed at which expander 150 and the target drive 106a can communicate with each other. Signal sequence 202 may comprise an out-of-band (OOB) signal and speed negation signals. To determine if expander 150 is capable of supporting persistent reservations and/or persistent affiliations, and to configure expander 150 to provide persistent reservations and/or persistent affiliations for a target SATA drive, initiator 142 and expander 150 may be capable of generating signal sequences as set forth below.

SAS initiator 142 may be capable of generating a general report inquiry signal 206, which may comprise an SMP request signal. In response thereto, expander 150 may be capable of generating a general information response signal 208, which may comprise an SMP response signal. General report information may comprise, for example, number of PHYs comprised in expander 150, and/or other general information related to expander 150, and may comprise predefined SMP general report request data. General report response signal 208 may also comprise data to inform SAS initiator of the existence of vendor-specific SMP requests and/or commands.

SAS initiator 142 may also be capable of generating an SMP DISCOVER signal 210. The DISCOVER signal 210 may comprise a vendor specific SMP request, and may be capable of determining if the expander 150 supports persistent reservations and/or persistent affiliations. In response thereto, the expander may be capable of generating an SMP RESPONSE signal 212. Signal 212 may instruct initiator 142 that the expander 150 supports persistent reservations and/or persistent affiliations for SATA drives. Expander device 150 may be capable of defining persistent reservations and/or persistent affiliations on a per PHY basis, and thus, signal 212 may indicate that a particular PHY comprised in expander 150 supports persistent reservations and/or persistent affiliations. Signal 212 may comprise vendor specific fields comprised in a standard SMP RESPONSE signal. Such vendor specific fields may permit, for example, the expander 150 to specify selected PHYs among a plurality of available PHYs that may support persistent reservations and/or persistent affiliations for SATA drives coupled thereto.

To enable or disable persistent reservations and/or persistent affiliations in the expander 150, initiator 142 may be capable of generating an SMP PHY control signal 214. Signal 214 may comprise instructions to enable and/or disable persistent reservations and/or persistent affiliations for selected PHYs comprised in expander 150. Signal 214 may comprise vendor specific SMP request that comprises one or more data fields comprising instructions to instruct the expander 150 to enable and/or disable persistent reservations and/or persistent affiliations for selected PHYs. Configuration status of one or more PHYs, as may be generated by signal 214, may be stored in memory 156. Expander device 150 may be capable of generating an SMP response signal 216 indicating that the PHY is properly configured to support persistent reservations and/or persistent affiliations. Expander device 150 may store PHY configuration data in memory 156. If memory 156 is non-volatile memory, such configuration information may be persistent across power cycles of the expander 150.

Exemplary Persistent Reservations Operations

Figure 3:
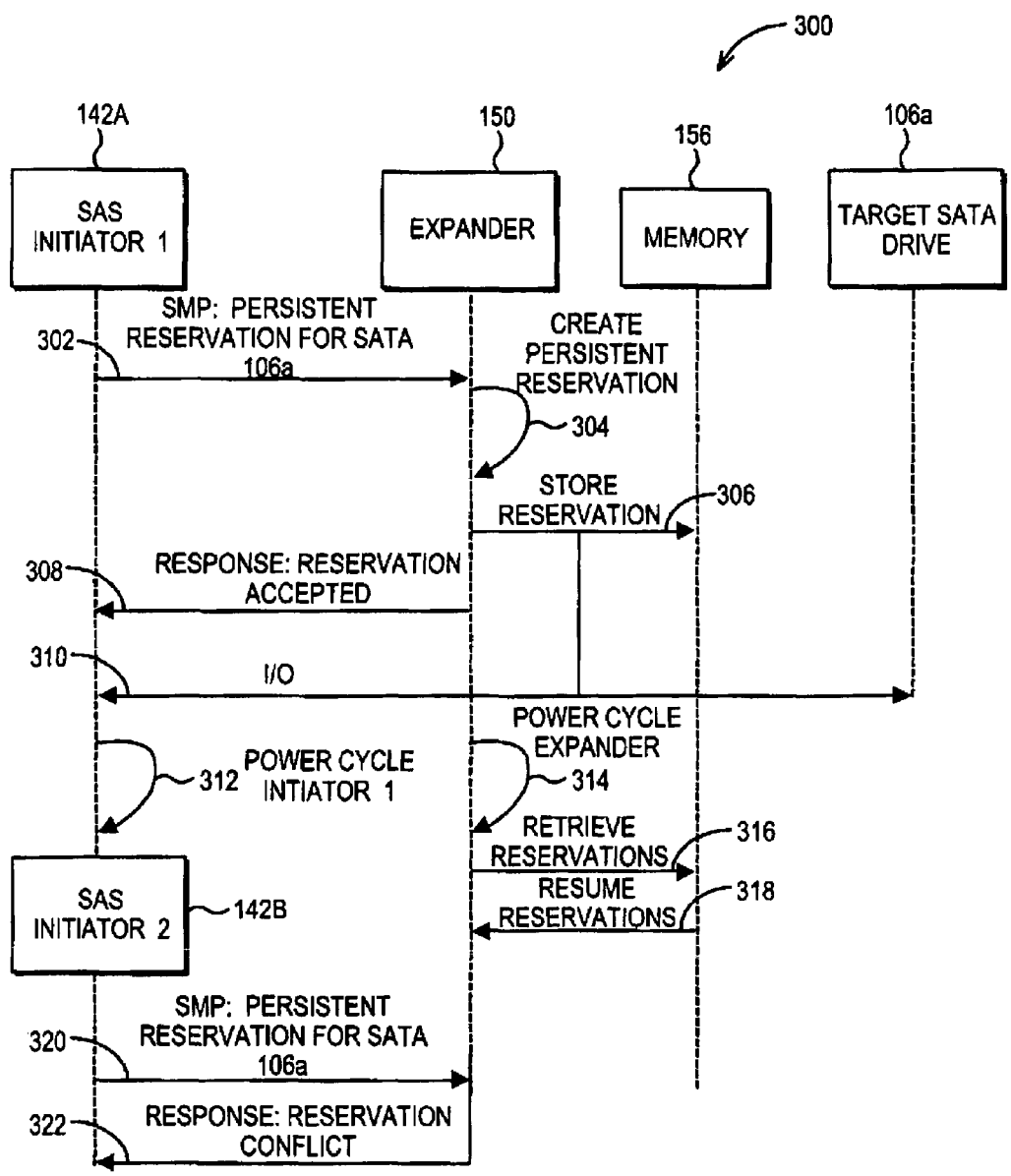
FIG. 3 is a diagram illustrating exemplary operations according to one embodiment.

FIG. 3 depicts a diagram 300 illustrating operations which may be performed by an embodiment. In FIG. 3, certain portions of the system 100 depicted in FIG. 1 have been omitted for clarity (for example circuit board 132 and circuit card 120), but it is to be understood that like parts of FIG. 3 can be implemented in a manner consistent with an embodiment depicted in FIG. 1 and/or FIG. 2, or alternatively in other system implementations, without departing from this embodiment. The following description of the diagram 300 of FIG. 3 shall make specific reference operations for providing persistent reservations for SATA drive 106a comprised in mass storage 106. However, it should be understood that the following description can apply to any SATA drive, whether or not comprised in mass storage 106. This embodiment depicts two SAS initiators 142A and 142B. It should be understood that each SAS initiator 142A and 142B may be comprised in separate circuit cards (for example circuit card 120 depicted in FIG. 1), and each initiator 142A and 142B may represent a multiple host system environment. SAS initiators 142A and 142B may comprise identical circuitry as described above with reference to SAS initiator 142, or alternatively may comprise different and/or additional circuitry.

SAS initiator 142A may be capable of generating an SMP request 302 to define a persistent reservation for a SATA drive, for example target SATA drive 106a. If the expander 150 supports persistent reservations, as may be determined by operations described above with reference to FIG. 2, the expander may create the persistent reservation 304 between initiator 1 and target SATA drive 106a. In one embodiment, the persistent reservation may be stored 306 in memory 156. The expander device 150 may be capable of generating a signal 308 indicative of an acceptance of the reservation. SAS initiator 1 (142A) may be capable of one or more I/O transactions 310, for example read and/or write transactions. If the persistent reservation 304 establishes a restricted access between initiator 142A and target SATA drive 106a, such an I/O transaction may be restricted in a manner consistent with the reservation. If a power cycle (e.g., boot, reboot and/or reset event) occurs in the SAS initiator 312 and/or the expander 314, the expander 150 may be capable of retrieving reservations 316, which may be stored in memory 156, in which case expander 150 may be capable of resuming reservations 318 between initiator 142a and target SATA device 106a. As an example, initiator SAS address and target SAS drive address data may be stored in memory 156. Memory 156 may also include registration key information, as may be defined in the aforementioned T10 standard. Of course, such data may be in the form of a table and may further comprise additional information, for example, as may be defined in the aforementioned SCSI Primary Commands.

In a system with two or more SAS initiators, a second or subsequent initiator 142B (SAS initiator 2) may be capable of generating an SMP request 320 to attempt to define a persistent reservation with target SATA drive 106a. Expander device 150, upon receiving such a request 320, may generate an SMP response signal 322 indicating a reservation conflict. In such an event, SAS initiator 2 may be denied a persistent reservation with target SATA drive 106a.

Alternatively or additionally, and referring again to FIG. 1, persistent reservations may be stored on or more SATA drives comprised in mass storage 106. For example, persistent reservations, as may be defined above, may be stored on one or more SATA drives 106a, 106b, 106c and/or 106d as machine readable metadata, which may permit the SATA drive to be disconnected from the system 100 and moved to another system environment while preserving reservations between one or more initiator engines. In this embodiment expander device 150 may be capable of determining the type of drive present and further may be capable of parsing the SATA register frame information structure (FIS) to determine if data (such as metadata) is present on the drive, and if such data represent persistent reservations. In one exemplary embodiment, expander device 150 may be capable of receiving persistent reservation information from one or more SATA drives and store the persistent reservations information in memory 156 comprised in the expander 150.

Exemplary Persistent Affiliations Operations

Figure 4:
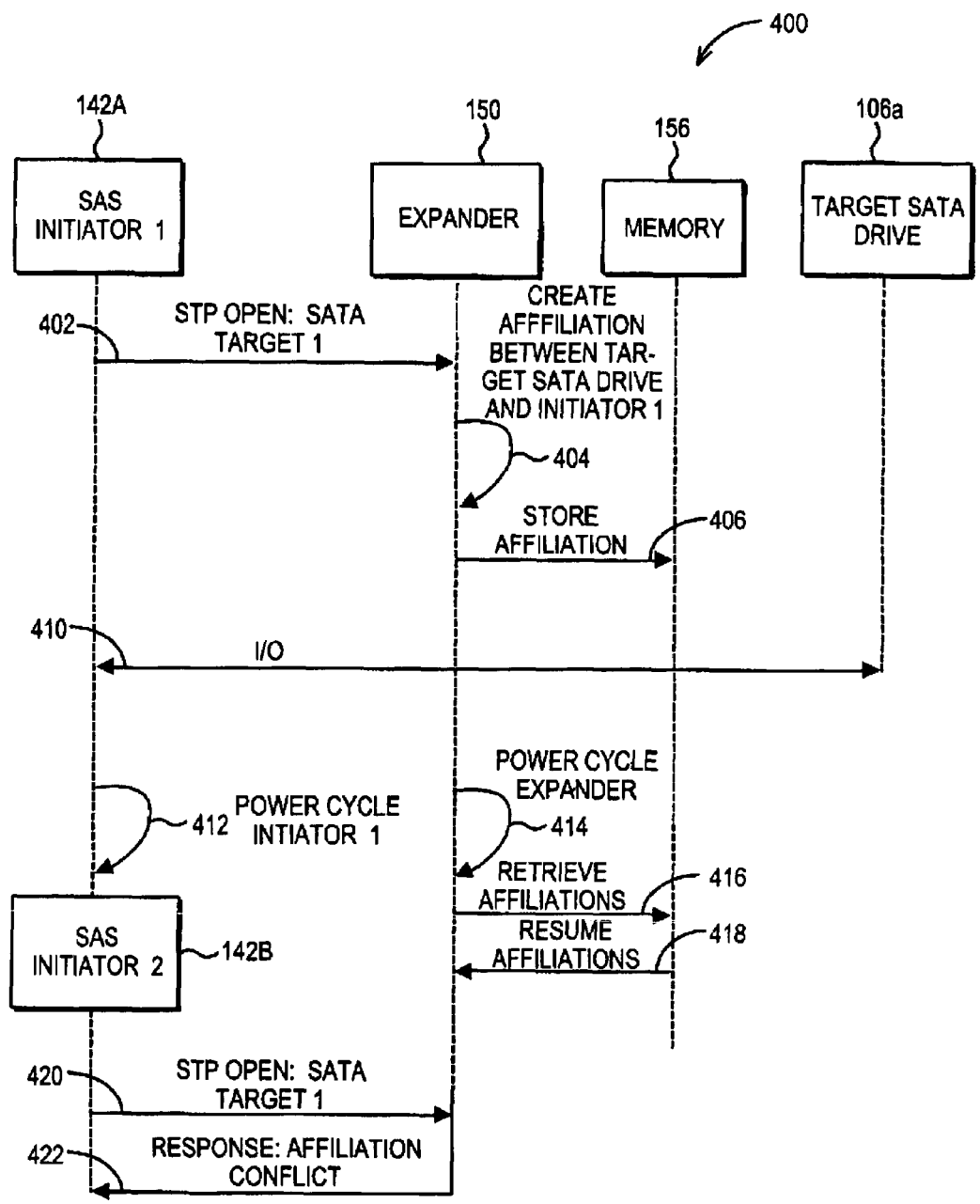
FIG. 4 is a diagram illustrating exemplary operations according to one embodiment.

FIG. 4 depicts a diagram 400 illustrating operations which may be performed by an embodiment. In FIG. 4, certain portions of the system 100 depicted in FIG. 1 have been omitted for clarity (for example circuit board 132 and circuit card 120), but it is to be understood that like parts of FIG. 4 can be implemented in a manner consistent with an embodiment depicted in FIG. 1, or alternatively in other system implementations, without departing from this embodiment. The following description of the diagram 400 of FIG. 4 shall make specific reference operations for providing persistent affiliations for SATA drive 106a comprised in mass storage 106. However, it should be understood that the following description can apply to any SATA drive, whether or not comprised in mass storage 106. This embodiment depicts two SAS initiators 142A and 142B. It should be understood that each SAS initiator 142A and 142B may be comprised in separate circuit cards (for example circuit card 120 depicted in FIG. 1), and each initiator 142A and 142B may represent a multiple host system environment. SAS initiators 142A and 142B may comprise identical circuitry as described above with reference to SAS initiator 142, or alternatively may comprise different and/or additional circuitry.

SAS initiator 142A may be capable of generating an STP command 402 to open communication to one or more target SATA drives 106a, via expander 150. STP command 402 may comprise a command that complies or is compatible with the aforementioned SAS standard. An affiliation 404 may be created between the target SATA drive 106a and SAS initiator 1. In one embodiment, the affiliation may be stored 406 in memory 156, which may create a persistent affiliation. SAS initiator 1 (142A) may be capable of one or more I/O transactions 410, for example read and/or write transactions. If the persistent affiliation 404 establishes a restricted access between initiator 142A and target SATA drive 106a, such an I/O transaction may be restricted in a manner consistent with the affiliation. If a power cycle (e.g., boot, reboot and/or reset event) occurs in the SAS initiator 412 and/or the expander 414, the expander 150 may be capable of retrieving affiliations 416, which may be stored in memory 156, in which case expander 150 may be capable of resuming affiliation 418 between initiator 142a and target SATA device 106a.

In a system with two or more SAS initiators, a second or subsequent initiator 142B (SAS initiator 2) may be capable of generating another STP command 420 to open communication to one or more target SATA drives 106a, via expander 150. If command 420 represents an attempt for SAS initiator 2 to gain access to target SATA drive 106a, expander device 150, upon receiving such a request 320, may generate an STP response signal 422 indicating an affiliation conflict. In such an event, SAS initiator 2 may be denied access to target SATA drive 106a.

Figure 5:
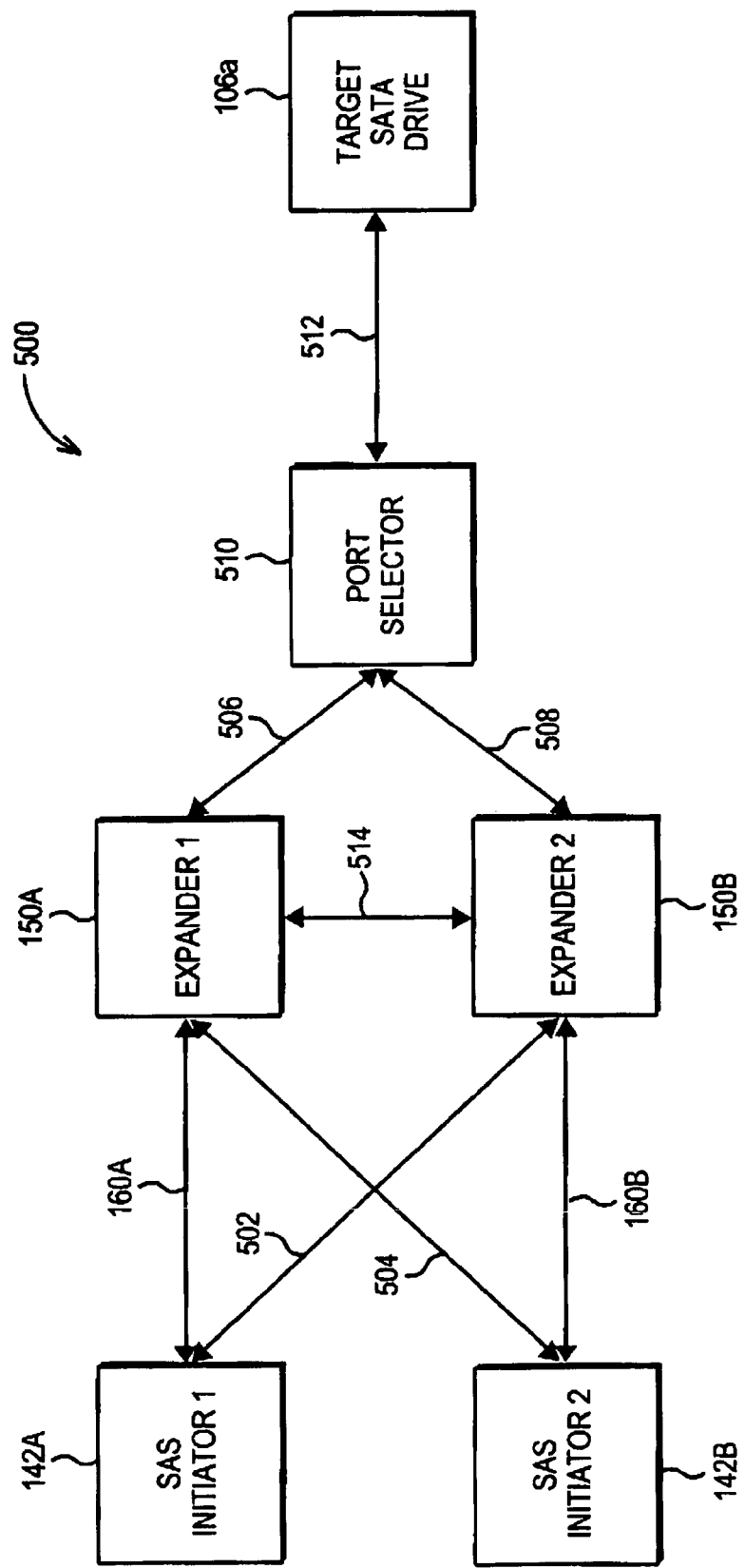
FIG. 5 is a diagram illustrating another system embodiment.

FIG. 5 is a diagram 500 illustrating another system embodiment. In FIG. 4, certain portions of the system 100 depicted in FIG. 1 have been omitted for clarity (for example circuit board 132 and circuit card 120), but it is to be understood that like parts of FIG. 4 can be implemented in a manner consistent with an embodiment depicted in FIG. 1, or alternatively in other system implementations, without departing from this embodiment.

This embodiment may include a plurality of SAS initiators, for example SAS initiator 1 (142A) and SAS initiator 2 (142B). Each initiator may be coupled to one or more SAS expanders, for example, SAS expander 1 (150A) and SAS expander 2 (150B). In this embodiment, one or more SATA drives 106a may comprise a dual-ported drive. "Dual-ported drive", as used herein, may be defined as a drive that can be coupled to one or more expanders. Port selector circuitry 410 may be coupled between the expanders (150A and 150B), via communication links 406 and 408, respectively, and the target SATA drive 106a, via communication link 412. Port selector circuitry may be capable of selecting which expander between Expander 1 and Expander 2 may be coupled to the target SATA drive 106a.

In this embodiment, each expander device 150A and 150B may be capable of creating persistent reservations and/or persistent affiliations between an initiator (e.g., Initiator 1 or Initiator 2) and the target SATA drive 106a in a manner described above with reference to FIGS. 1–4. Thus, each expander device may be coupled to each initiator device via communication links 160A, 160B, 402 and 404. Each expander device 150A and 150B may be capable of exchanging commands and data with each other, via communications link 414. Persistent reservations information and/or persistent affiliation information, as may be defined in each expander 150A and 150B, may be shared with each expander. Thus, persistent reservation and/or persistent affiliation conflicts between two or more expanders and/or two or more initiators may be avoided.

Although embodiments herein describe creating persistent reservations for SATA drives, it should be understood that this disclosure may also provide persistent reservations and/or persistent affiliations for SAS drives that do not support persistent reservations and/or persistent affiliations. Also, the expander device may be capable of creating persistent reservations and/or persistent affiliations between one or more initiator engines and one or more SATA drives. Also, embodiments herein describe the functionality of the expander 150 for creating and maintaining persistent reservations and/or persistent affiliations, however, it should be understood that other integrated circuits may be capable of such functionality, for example, integrated circuits comprised in circuit card 120 and/or host system motherboard 132.

Thus, in summary, at least one embodiment herein may provide an expander device that may be capable of communicating with one or more initiator engines and one or more target storage devices using a plurality of communication protocols. The expander device may also be capable of creating at least one of persistent reservations and persistent affiliations between one or more target SATA storage devices and one or more initiator engines.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
an expander device capable of communicating with one or more initiator engines and a plurality of target storage devices using a plurality of communication protocols, said plurality of target storage devices including one or more target SATA storage devices, said expander device further capable of creating at least one of a persistent reservation or persistent affiliation between one or more target SATA storage devices of said plurality of storage devices and one or more said initiator engines, said persistent reservation and said persistent affiliation capable of being maintained across power cycles.

2. The apparatus of claim 1, wherein:
said expander device capable of exchanging serial management protocol (SMP) commands with one or more of said initiator engines to define at least one of said persistent reservation and persistent affiliation between the one or more target SATA storage devices and said one or more initiator engines.

3. The apparatus of claim 2, wherein:
said SMP commands comprise one or more of vendor specific data fields and vendor specific commands, said vendor specific data fields comprise and said vendor specific commands comprise data indicative of at least one of said persistent reservation and persistent affiliation.

4. The apparatus of claim 1, wherein:
said expander device comprising one or more physical interfaces (PHYs) capable of communicating with said one or more target devices, said expander device further capable of assigning at least one of said persistent reservation and persistent affiliation to one or more said PHYs.

5. The apparatus of claim 1, wherein:
at least one of said persistent reservation and persistent affiliation comprising one or more commands to create an exclusive access between one of said initiator engines and one of said target SATA devices.

6. The apparatus of claim 1, wherein:
said expander device further capable of receiving a request for at least one of a persistent reservation and a persistent affiliation from one or more said initiator engines, said expander device further capable of determining at least one of if a persistent reservation conflict exists between the request for a persistent reservation and an existing reservation and if a persistent affiliation conflict exists between the request for a persistent affiliation and an existing affiliation.

7. The apparatus of claim 1, wherein:
said expander device further capable of storing at least one of said persistent reservation and persistent affiliation in memory.

8. The apparatus of claim 7, wherein:
said expander device further capable of retrieving at least one of said persistent reservation and persistent affiliation from said memory after a power cycle of said expander device.

9. The apparatus of claim 1, wherein:
at least one said expander device is further capable of communicating at least one of persistent reservation and persistent affiliation information with another expander device.

10. A system, comprising:
a circuit card comprising an integrated circuit capable of communicating in accordance with a plurality of different communication protocols, the circuit card being capable of being coupled to a bus, and an expander device capable of communicating with said circuit card and a plurality of target storage devices using a plurality of communication protocols, said plurality of target storage devices including one or more target SATA storage devices, said expander device further capable of creating at least one of a persistent reservation or a persistent affiliation between said circuit card and one or more target SATA storage devices, said persistent reservation and said persistent affiliation capable of being maintained across power cycles.

11. The system of claim 10, wherein:
said expander device capable of exchanging serial management protocol (SMP) commands with said circuit card to define at least one of said persistent reservation and persistent affiliation between the one or more target SATA storage devices and said circuit card.

12. The system of claim 11, wherein:
said SMP commands comprise one or more of vendor specific data fields and vendor specific commands, said vendor specific data fields comprise and said vendor specific commands comprise data indicative of at least one of persistent reservation and persistent affiliation.

13. The system of claim 10, wherein:
said expander device comprising one or more physical interfaces (PHYs) capable of communicating with said one or more target devices, said circuit card further capable of assigning at least one of said persistent reservation and persistent affiliation to one or more said PHYs.

14. The system of claim 10, wherein:
at least one of said persistent reservation and persistent affiliation comprising one or more commands to create an exclusive access between said circuit card and one of said target SATA storage devices.

15. The system of claim 10, wherein:
said expander device further capable of receiving a request for at least one of a persistent reservation and a persistent affiliation from said circuit card, said expander device further capable of determining at least one of if a persistent reservation conflict exists between the request for a persistent reservation and an existing reservation and if a persistent affiliation conflict exists between the request for a persistent affiliation and an existing affiliation.

16. The system of claim 10, wherein:
said expander device further capable of storing at least one of said persistent reservation and persistent affiliation in memory.

17. The system of claim 16, wherein:
said expander device further capable of retrieving at least one of said persistent reservation and persistent affiliation from said memory after a power cycle of one or more of said expander device, said circuit card and said target SATA storage device.

18. An article comprising:
a storage medium having stored thereon instructions that when executed by a machine result in the following operations:
creating at least one of a persistent reservation or persistent affiliation between one or more target SATA storage devices of a plurality of target storage devices and one or more initiator engines, said persistent reservation and said persistent affiliation capable of being maintained across power cycles.

19. The article of claim 18, further comprising the following operations:
generating serial management protocol (SMP) commands according to a Serial Attached SCSI (SAS) protocol to define at least one of said persistent reservation and persistent affiliation between the one or more target SATA storage devices and said one or more initiator engines.

20. The article of claim 18, further comprising the following operations:
generating vendor specific data fields comprised in said SMP commands, said vendor specific data fields comprise data indicative of at least one of said persistent reservation and persistent affiliation.

21. The article of claim 18, further comprising the following operations:
generating vendor specific SMP commands, said vendor specific SMP commands comprise data indicative of at least one of said persistent reservation and persistent affiliation.

22. The article of claim 18, further comprising the following operations:
receiving a request for at least one of a persistent reservation and a persistent affiliation from one or more said initiator engines, and determining at least one of if a persistent reservation conflict exists between the request for a persistent reservation and an existing reservation and if a persistent affiliation conflict exists between the request for a persistent affiliation and an existing affiliation.

23. A method, comprising:
creating at least of one of a persistent reservation or a persistent affiliation between one or more target SATA storage devices of a plurality of target storage devices and one or more initiator engines, said persistent reservation and said persistent affiliation capable of being maintained across power cycles.

24. The method of claim 23, further comprising:
generating serial management protocol (SMP) commands according to a Serial Attached SCSI (SAS) protocol to define at least one of said persistent reservation and persistent affiliation between the one or more target SATA storage devices and said one or more initiator engines.

25. The method of claim 23, further comprising:
generating vendor specific data fields comprised in said SMP commands, said vendor specific data fields comprise data indicative of at least one of persistent reservation and persistent affiliation.

26. The method of claim 23, further comprising:
generating vendor specific SMP commands, said vendor specific SMP commands comprise data indicative of at least one of said persistent reservation and persistent affiliation.

27. The method of claim 23, further comprising:
receiving a request for at least one of said persistent reservation and persistent affiliation from one or more said initiator engines, and determining at least one of if a persistent reservation conflict exists between the request for a persistent reservation and an existing reservation and if a persistent affiliation conflict exists between the request for a persistent affiliation and an existing affiliation.

* * * * *